Jan. 6, 1970  C. M. STEVENS  3,488,621
PLUG-IN OUTLET CONSTRUCTION FOR BUSWAY SYSTEMS
Filed June 9, 1967  3 Sheets-Sheet 1
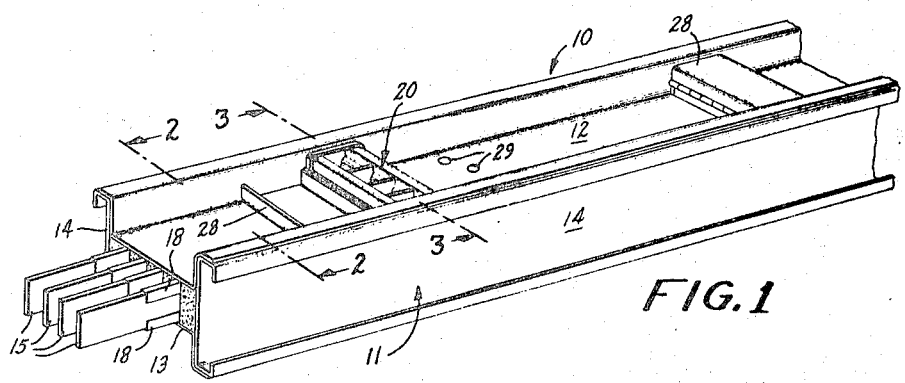
FIG. 1
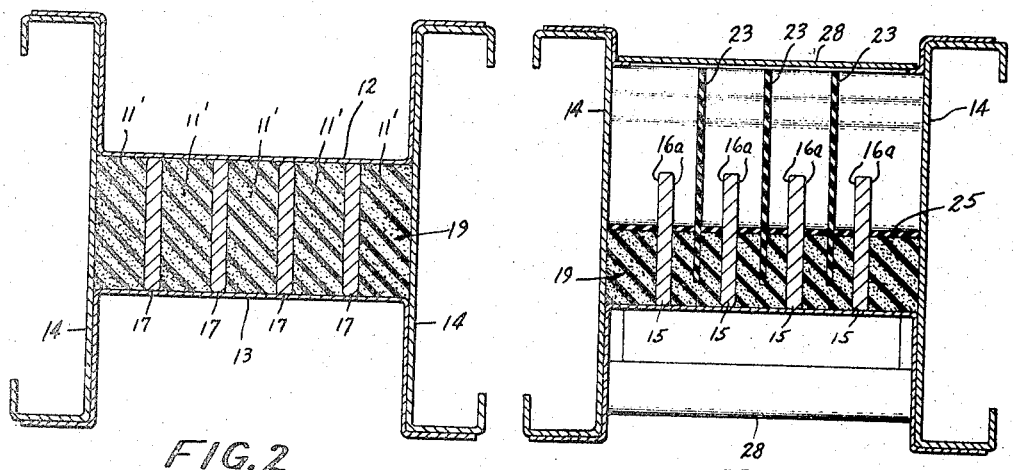
FIG. 2
FIG. 3
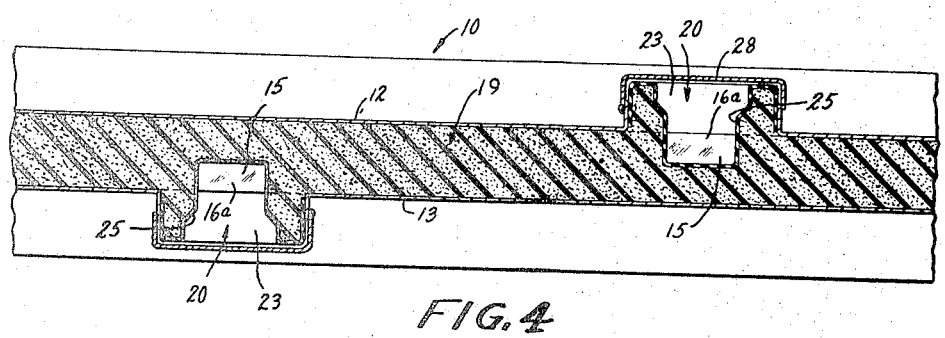
FIG. 4
INVENTOR
CLARENCE M. STEVENS, DECEASED,
BY MARTHA N. STEVENS, EXECUTRIX.
BY Arthur E. Fournier Jr.
ATTORNEY INVENTOR
CLARENCE M. STEVENS, DECEASED,
By MARTHA N. STEVENS, EXECUTRIX.

ATTORNEY

United States Patent Office 3,488,621
Patented Jan. 6, 1970

3,488,621
PLUG-IN OUTLET CONSTRUCTION FOR BUSWAY SYSTEMS
Clarence M. Stevens, deceased, late of West Hartford, Conn., by Martha N. Stevens, executrix, West Hartford, Conn., assignor to General Electric Company, a corporation of New York
Filed June 9, 1967, Ser. No. 647,886
Int. Cl. H01r *13/60*
U.S. Cl. 339—22        4 Claims

ABSTRACT OF THE DISCLOSURE

A plug-in type electric power busway, including: an elongated generally rectangular metal duct having a number of bus bars in insulated spaced relation therein. The space in the duct between the bars, and between the bars and the housing, is filled with foam plastic insulation. The duct has extended side portions, the extensions forming channel-shaped recesses along either side of the duct. Longitudinally spaced openings are provided in the duct within the aforesaid recesses. In each such opening, a multi-section pocket is formed of sheet insulation, extending into the duct and exposing a portion of one of the bars in each pocket section to facilitate plug-in contact.

BACKGROUND OF THE INVENTION

(1) Field of the invention

The invention relates to electrical power distribution systems of the enclosed bus bar type and, more particularly, to distribution systems of this type commonly referred to as "busways" wherein power take-off connections may be made by the use of one or more plug-in type power take-off devices.

(2) Description of the prior art

U.S. patent application Ser. No. (41D–322) of W. Giger, Jr. et al. filed May 31, 1967, now Patent 3,439,-309 issued Apr. 15, 1969 and assigned to the same assignee as the present invention shows a form of plug-in busway in which the bus bars are laterally supported and held in spaced relation by means of a foam plastic type insulation material. In the plug-in type busway described in the aforesaid patent application, the plug outlets are formed by means of a series of molds, there being one mold provided for each of the plurality of outlets formed in a given length of busway. The necessity for such molds adds appreciably to the cost of manufacture, since each busway "length" of about 10 feet, ordinarily includes 5 such outlets on each side.

In addition, a foam plastic insulation material having a relatively high density is required in the busway illustrated in the aforesaid patent application, in order to ensure that the bars will be sufficiently protected against the high magnetic forces resulting from short-circuit currents which tend to bend and/or distort the bars. Although such foam plastic insulation materials are relatively inexpensive when compared to other forms of insulation generally employed in busways of this type, their cost varies almost directly with their density. That is, an insulation material being twice as dense will cost twice as much. Thus, to get the full advantage of the cost savings possible from the use of such insulation materials, it is desirable to be able to utilize a foam plastic insulation material having a relatively low density, while still being capable of performing its intended functions in a satisfactory manner.

Also, with the plug-in opening structure utilized in the aforesaid patent application, the foam plastic insulation material selected for use therein must have very good electrical "tracking" characteristics to prevent electrical breakdown at the plug-in area between adjacent bus bars. Although foam plastic type insulation materials having this characteristic do not cost materially more than do those that do not, the need for this charactertisic restricts the types of foam plastic type insulation materials which might be used.

It is an object of the present invention to provide a plug-in type electric power busway including plug-in socket insulating structure which supports the bus bars at the plug-in openings, and permits the use of low density foam plastic type insulation material elsewhere along their length.

It is another object of the present invention to provide a busway of the type described having socket insulating structure including means which permits the use of foam plastic type insulating materials having only moderate electrical "tracking" characteristics.

A still further object of the present invention is to provide a busway of the foam plastic filled plug-in type including means for forming plug-in sockets therein which does not require the use of a plurality of relatively expensive molds.

SUMMARY OF THE INVENTION

In accordance with the invention, there is provided a plug-in type electrical power distribution system comprising a generally rectangular metallic housing or duct having a plurality of spaced plug-in sockets or openings therein. A plurality of elongated, relatively wide, thin, flat electrical conductors or bus bars are supported within the housing in spaced relation with their wide surfaces lying in substantially parallel planes. A non-metallic channel-shaped member having a plurality of slots therein for receiving the bus bars is positioned within the housing at each of the plug-in sockets. A plurality of barrier members of insulating material are supported by the channel-shaped member and are interposed between the bus bars in spaced relation thereto at each of the plug-in sockets. A low-density insulating means substantially completely fills the remaining portions of the interior of the housing and supports the bus bars throughout their remaining length, and holds the channel-shaped member and the barrier members suitably positioned within the housing in juxtaposed relation to the sockets.

The invention will be more fully understood from the following detailed description and its scope will be pointed out in the appended claims.

DESCRIPTION OF THE DRAWINGS

In the drawings:
FIGURE 1 is a perspective view of a portion of a busway section incorporating the present invention;
FIGURE 2 is a sectional view of the busway section of FIGURE 1, taken substantially on the line 2—2 of FIGURE 1;
FIGURE 3 is a sectional view of the busway section of FIGURE 1, taken substantially on the line 3—3 of FIGURE 1;
FIGURE 4 is a longitudinal section view of a portion of the busway section of FIGURE 1.

Referring now to FIGURE 1, the invention is shown as incorporated in a section 10 of busway comprising a housing 11 having top and bottom walls 12 and 13, respectively and a pair of side walls 14, and an assembly of individual bus bars 15 enclosed within the housing 11.

Figure 5:
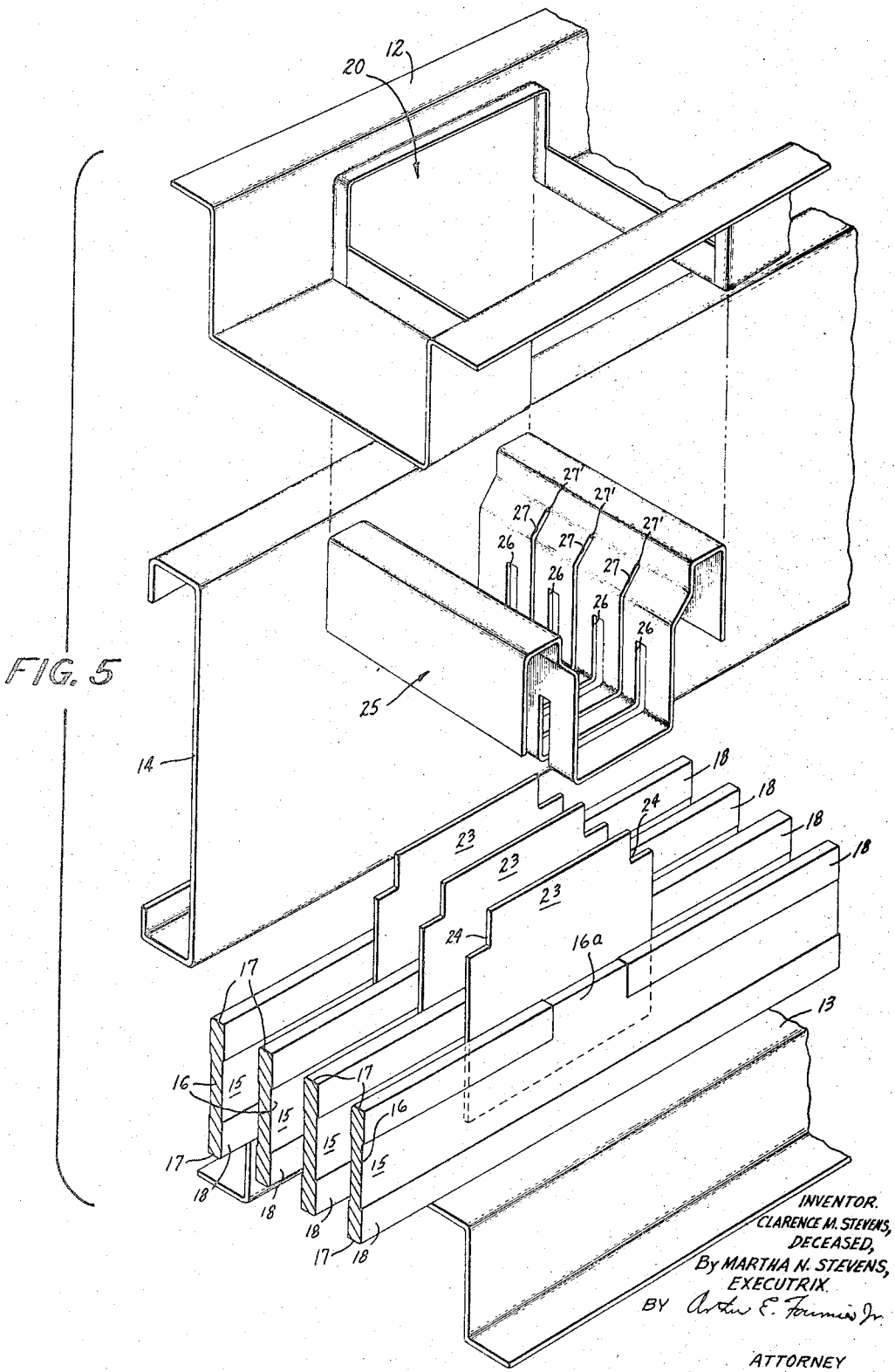
FIGURE 5 is an exploded perspective view of a portion of the busway section of FIGURE 1 including a plug-in socket.

As best seen in FIGURE 2, the bus bars 15 are positioned within the busway housing 11 with their wide faces 16 in parallel spaced relation to each other and to the side walls 14 of the busway housing 11. For the purpose of electrically insulating the bus bars 15 from the top and bottom walls 12 and 13, respectively, of the busway housing 11, narrow C-shaped strips 18 of insulation material are positioned on each of the narrow faces 17 of the bus bars 15 and extend substantially the entire length thereof. The strips 18 are preferably relatively thin, and constructed of insulation material such as synthetic plastics having relatively good thermal conducting ability. The narrow faces 17 of the bus bars 15 are therefore in intimate thermal contact with the top and bottom walls 12 and 13, respectively, of the busway housing 11 although electrically insulated therefrom.

The bus bars 15 as seen in FIGURE 2 accordingly divide the interior of the busway section 10 into a plurality of individual compartments 11' extending substantially the entire length thereof. A low density foam plastic type insulation material 19 substantially completely fills each of the compartments 11' thereby providing insulation between the wide faces 16 of adjacent bus bars 15, and also between the outermost bus bars 15 and the side walls 14 of the busway housing 11. By occupying the otherwise void space in each of the compartments 11', this low-density insulation material 19 precludes the entrance of moisture therein and/or the presence of moisture due to condensation with the housing 11. Further, the insulation material 19 gives the busway housing 11 additional strength against buckling, and the bus bars 15 strength against distortion by short-circuit forces.

For the purpose of providing access for plug-in type power take-off devices to the individual bus bars 15 enclosed within the busway section 10, the top wall 12 of the housing 11 is provided with a plurality of openings or sockets 20 suitably spaced along the length of the busway section 10.

The construction of the busway section 10 at each location where there is an opening 20 can best be seen with reference to FIGURES 3 and 5. As shown therein, one of the narrow faces 17 of each of the individual bus bars 15 is in intimate electrically insulated thermal contact with the bottom wall 13 of the busway housing 11. Portions of the wide faces 16 of the bus bars 15 are electrically insulated from each other and from the side walls 14 of the busway housing 11 by means of the foam plastic insulation material 19. The remaining portions 16a of the wide faces 16 of the bus bars 15 are free of the insulation material 19, to thereby provide areas in which electrical contact may be made between the bus bars 15 and the clothespin-type stabs 21 of the plug-in type power take-off device 22, in the manner shown in FIGURE 8. Also, a portion of the C-shaped insulation strip 18 on the other of the narrow faces 17 of the bus bar 15 is removed at the opening 20 to provide the requisite uninsulated surface needed for making electrical contact between the bus bars 15 and the stabs 21 of the power take-off device 22.

Interposed in spaced relation between the wide faces 16 of each pair of adjacent bus bars 15 is an insulation barrier member 23 comprising a thin sheet of insulation material, one end of which has a pair of notched corners 24 for a purpose to be later described hereinbelow. Since as best seen in FIGURE 3 the lower portions of the bus bars 15 are insulated from each other by the insulation material 19, the barrier members 23 need not extend completely to the bottom wall 13 of the housing 11. These barrier members 23 help guide the stabs 21 of the power take-off device 22 into engagement with the busbars 15, also help ensure that there will be no unintentional electrical contact between the stabs 21 and adjacent bus bars 15, and finally ensure the isolation of the individual bus bars 15 from each other which is desirable especially in those instances wherein the bars 15 carry different phases of electrical current.

A non-metallic channel-shaped member 25 preferably made of plastic insulation material such as for example a high density foam plastic by an extrusion process is positioned over the bus bars 15 at each of the openings 20 in the busway housing 11. The member 25 by virtue of a first set of slots 26 provided therein which are such as to receive the bus bars 15 in a closely fitting relationship gives the bars 15 additional lateral support above and beyond that provided by the insulation material 19. This additional support of the bars 15 by the member 25 has been found to be of such a sufficient nature as to permit the use of a relatively low density foam plastic type insulation material 19 throughout the remainder of the busway section 10. Another function of the member 25 consists of accurately positioning the bars 15, i.e., maintaining their proper spacing while the foam plastic insulation material 19 is being introduced into the busway housing 11. A second set of slots, designated by the reference numeral 27, receive the insulation barrier members 23 in a tightly fitting relationship with the previously referred to notched corners 24 of the barrier members 23 engaging the outermost portions 27' of the slots 27.

With reference to FIGURE 5, for the purpose of providing clearance between the uninsulated portions of the bus bars 15 and the metallic top wall 12 of the busway housing 11, the top wall 12 is offset outwardly at each opening 20. A further purpose of this outward offset is to provide space within which to accommodate the channel-shaped member 25 and the insulation barrier members 23. Preferably at each opening 20 there is provided a suitable cover 28 which may be fastened in the closed position whenever a power take-off device 22 is not installed at that particular location.

Figure 6:
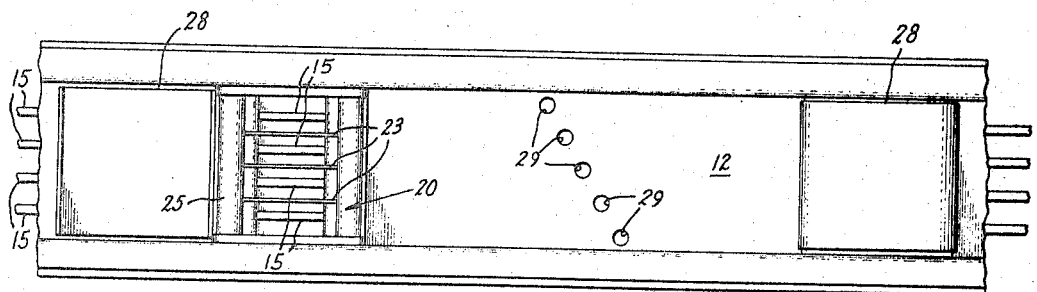
FIGURE 6 is a plan view of a portion of the busway section of FIGURE 1.
Figure 7:
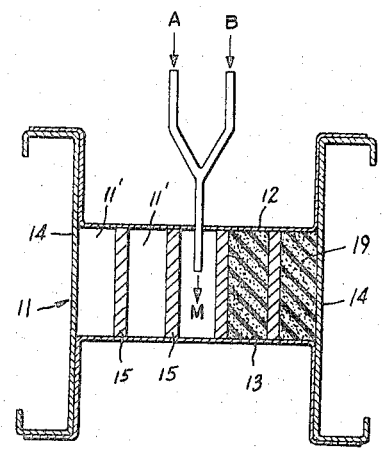
FIGURE 7 is a sectional view of the busway section of FIGURE 1 illustrating the manner in which the foam plastic insulation material is introduced into the interior of the busway housing.
Figure 8:
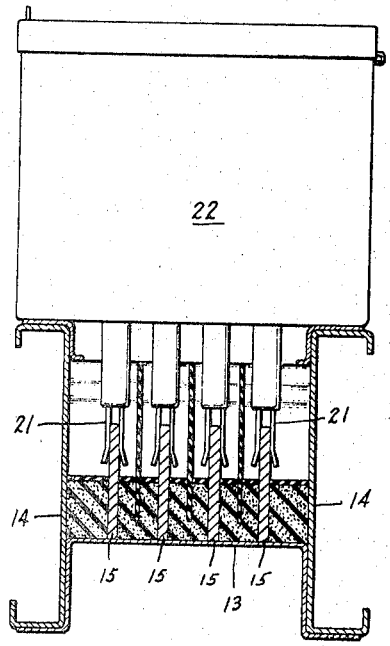
FIGURE 8 is a sectional view of the busway section of FIGURE 1 showing a plug-in type power take-off device mounted thereon.

Preferably the foam plastic insulation material 19 is introduced into the busway housing 11 in liquid form through openings 29 and allowed to expand in place. A plurality of openings 29 are shown in FIGURE 6, the number of openings being equal to the number of compartments 11' present in the interior of the busway housing 11. In accordance with a preferred form of the invention and as shown in FIGURE 7, the foam plastic insulation material 19 comprises a basic resin "A" which is introduced into the busway housing 11 simultaneously with a "foaming" or "blowing" agent "B," and mixed therewith as it enters the housing 11. Although the insulation material 19 is in liquid form when introduced into the busway housing 11, the close fit between the bus bars 15, the barrier members 23, and the channel-shaped member 25 prevents the insulation material 19 from flowing into the outlet opening 20. Thus, as seen in FIGURES 3 and 8, the interior of the channel-shaped member 25 remains free of insulation material 19 thereby providing space for the insertion of the stabs 21 of the power take-off device 22.

When expanded, the foam plastic insulation material 19 substantially completely fills the area lying between the channel-shaped member 25 and the bottom wall 13, and thereby surrounds a considerable portion of the bus bars 15 and the barrier members 23. By virtue of this, the foam plastic insulation material 19 provides reinforcement for the bus bars 15 at each of the openings 20. This reinforcement is desirable from the standpoint of ensuring that the individual bus bars 15 remain properly positioned for and during engagement by the stabs 21 of the power take-off device 22. Further, because the barrier members 23 are embedded in the insulation material 19, they remain properly positioned with the space there-between being sufficient to permit the entrance of the stabs 21, but being such as to preclude the entrance of most undesired objects which could present a hazard to the operation of the busway.

In the embodiment illustrated in FIGURE 4, openings 20 are provided in both the top and bottom walls 12 and 13, respectively. Preferably, the openings 20 in the top and bottom walls 12 and 13 are offset longitudinally along the length of the busway section 10 in order to avoid any problems which might otherwise arise due to the possible interference between barrier members 23 present at each of the openings 20.

While the specific embodiments of the invention which have been shown include four bus bars and three barrier members, it will be readily appreciated that more or fewer bars and barrier members may be used or other modifications made without departing from the spirit and scope of the invention.

What I claim as new and desire to secure by Letters Patent of the United States is:

1. A plug-type power distribution system of the enclosed busbar type comprising prefabricated longitudinal sections, each section comprising:
   (a) an elongated rigid metallic housing having at least one opening along the length thereof for receiving a plug-in type power take-off device;
   (b) a plurality of elongated electrical conductors, each having a pair of relatively wide faces and a pair of relatively narrow faces;
   (c) non-metallic channel-shaped insulating means supported within said housing adjacent said opening, said channel-shaped means having a plurality of slots therein receiving a portion of said wide faces of said electrical conductors;
   (d) a plurality of discrete barrier members supported within said housing adjacent said opening by said non-metallic channel-shaped insulating means, said barrier members each being interposed between said wide faces of a corresponding pair of said electrical conductors in spaced relation thereto; and
   (e) insulating means substantially completely filling the interior of said housing along the entire length thereof and supporting said electrical conductors, said channel-shaped means, and said barrier members within said housing.

2. A plug-in type power distribution system as set forth in claim 1, wherein
   (a) said insulating means comprises low-density expandable foam plastic insulation material; and
   (b) said foam plastic insulation material being introduced into said housing in liquid form and allowed to expand in place.

3. A plug in-type power distribution system of the enclosed busbar type comprising prefabricated longitudinal sections, each section comprising:
   (a) an elongated rigid metallic housing having at least one opening along the length thereof for receiving a plug-in type power take-off device;
   (b) plurality of elongated electrical conductors, each having a pair of relatively wide faces and a pair of relatively narrow faces;
   (c) non-metallic channel-shaped insulating means supported within said housing adjacent said opening, said channel-shaped means having a plurality of slots therein for receiving a portion of said wide faces of said electrical conductors;
   (d) a plurality of barrier members supported within said housing adjacent said opening, and said barrier members each being interposed between said wide faces of a corresponding pair of said electrical conductors in spaced relation thereto; and
   (e) insulating means substantially completely filling the interior of said housing along the entire length thereof and supporting said electrical conductors, said channel-shaped means, and said barrier members within said housing.
   (f) said non-metallic channel-shaped insulating means including a first and a second set of slots;
   (g) said first set of slots receiving a portion of said wide faces of said electrical conductors; and
   (h) said second set of slots receiving a portion of said barrier members for properly locating said barrier members between corresponding pairs of said electrical conductors.

4. A plug-in type power distribution system of the enclosed bus bar type comprising prefabricated longitudinal sections, each section comprising:
   (a) an elongated rigid metallic housing having at least one opening along the length thereof for receiving a plug-in type power take-off device;
   (b) a plurality of elongated electrical conductors each having a pair of relatively wide faces and a pair of relatively narrow faces, said plurality of elongated electrical conductors being supported within said elongated housing with said relatively wide faces thereof in parallel spaced relation to each other and to said housing, and said relatively narrow faces in electrically insulated intimate thermal contact with said housing;
   (c) a non-metallic channel-shaped insulating member supported within said housing adjacent said opening, said channel-shaped member having a first set and a second set of slots therein, said first set of slots receiving a portion of said wide faces of said electrical conductors whereby a portion of said wide faces extends into the interior of said channel-shaped member;
   (d) a plurality of barrier members positioned within said housing adjacent said opening, said barrier members each being interposed between said wide faces of a corresponding one of said electrical conductors in spaced relation thereto, said second set of slots receiving a portion of said barrier members;
   (e) a non-metalic insulation means substantially completely filling the interior of said housing along the entire length thereof and supporting said electrical conductors, said channel-shaped means, and said barrier members within said housing; and
   (f) said interior of said channel-shaped insulating member being free of said insulation means so that a plug-in connection may be made with said plug-in type power take-off device.

References Cited

UNITED STATES PATENTS

| 2,150,963 | 3/1939 | De Mask. | |
| 2,186,377 | 1/1940 | Frank. | |
| 2,264,075 | 11/1941 | Frank. | |
| 2,720,632 | 10/1955 | Stieglitz. | |
| 3,015,082 | 12/1961 | Meacham. | |
| 3,018,320 | 1/1962 | Rowe. | |
| 3,221,085 | 11/1965 | Rill, et al. | 264—45 |
| 3,401,230 | 9/1968 | Giger | 174—98 |

MARVIN A. CHAMPION, Primary Examiner

PATRICK A. CLIFFORD, Assistant Examiner

U.S. Cl. X.R.

174—98; 264—45